Patented July 15, 1930

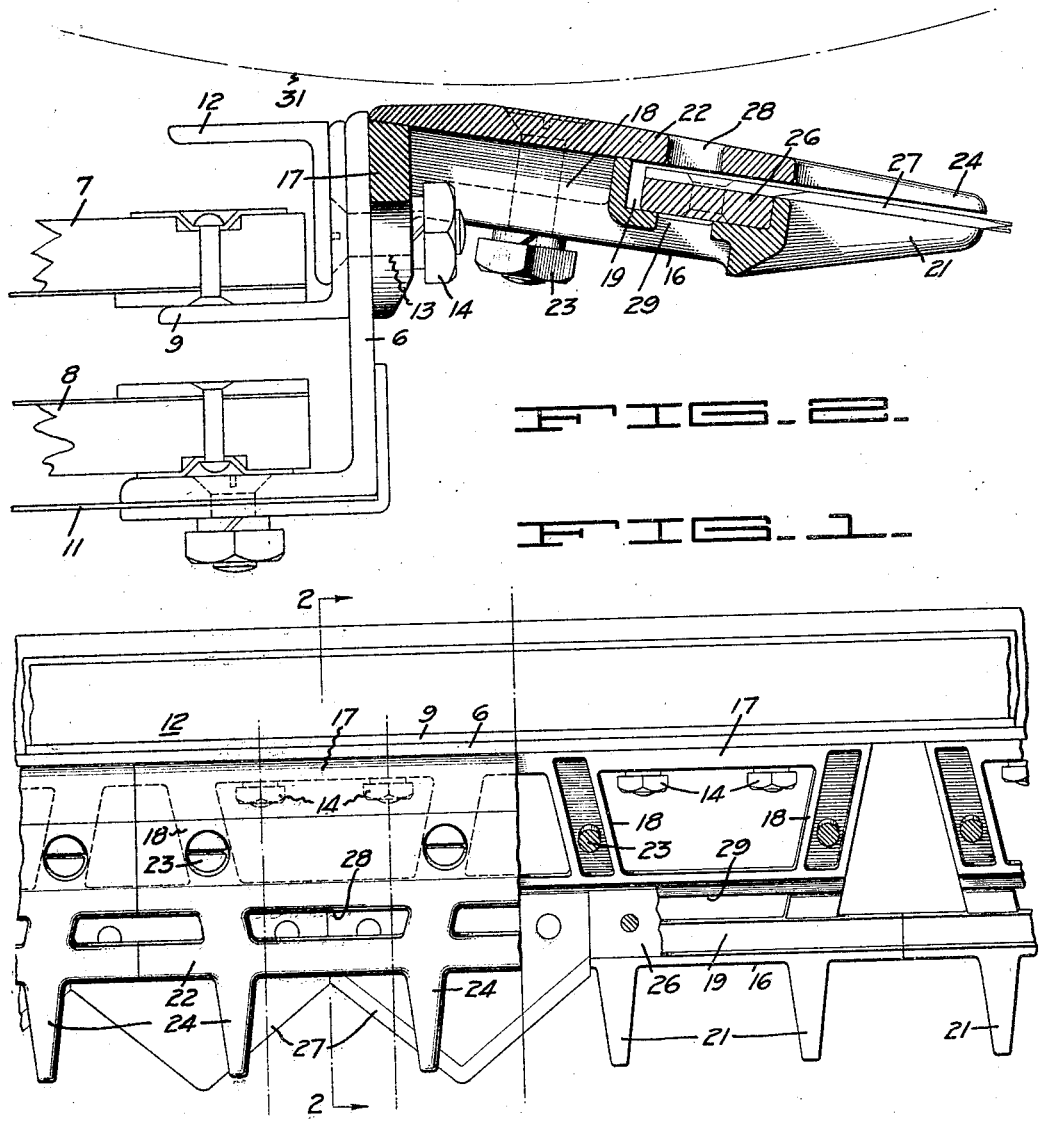

1,770,709

UNITED STATES PATENT OFFICE

ELMER PATTERSON AND LESTER McDOW, OF STOCKTON, CALIFORNIA, ASSIGNORS, BY MESNE ASSIGNMENTS, TO CATERPILLAR TRACTOR CO., OF SAN LEANDRO, CALIFORNIA, A CORPORATION OF CALIFORNIA

SICKLE GUARD

Application filed April 19, 1927. Serial No. 184,862.

Our invention relates to sickle guards for use on harvesting machinery such as mowing machines and headers of the type used in combined harvesters. Sickle guards as at present constructed usually comprise a body having a projecting prong and a channel spaced a considerable distance from the point of the prong. A number of such bodies are secured in line to the framework of the header and a sickle bar is seated in alined channels. As the header is driven over a field, the prongs are spaced at any desired distance above the ground, as the entire header is usually tiltable, and aid in guiding the standing grain to the rapidly vibrating sickle bar which cuts it. The prongs are prone to clog with débris occuring in the field and they are usually of such irregular contour that the grain does not pass thereover with the greatest ease. It is also difficult to lubricate the rapidly moving sickle bar properly as lubricant readily combines with the dirt and dust to form an effective abrasive.

It is therefore an object of our invention to provide a sickle guard which will not clog. Another object of the invention is to provide a sickle guard which permits the sickle to cut grain closer to the ground than is at present the case.

An additional object of the invention is to provide a sickle guard which can be swept free of grain.

An additional object of the invention is to provide a sickle guard which affords practically no obstruction to grain passing thereover.

A further object of our invention is to provide a sickle guard in which the sickle bar is substantially enclosed but can be flushed and lubricated.

The invention possesses other advantageous features, some of which, with the foregoing, will be set forth at length in the following description where we shall outline in full that form of the sickle guard of our invention, which we have selected for illustration in the drawings accompanying and forming part of the present specification. In said drawings, we have shown one form of sickle guard embodying our invention, but it is to be understood that we do not limit ourselves to such form since the invention as set forth in the claims may be embodied in a plurality of forms.

In the drawings:

Fig. 1 is, on the left half, a plan of the sickle guard of our invention as it is attached to a header; and, on the right half, is a plan of the sickle guard of our invention with the cover plate removed, a portion of the sickle bar being broken away.

Fig. 2 shows our sickle guard in section as it is attached to a header, the plane of section being indicated by line 2—2 of Fig. 1.

The sickle guard of our invention preferably comprises a structure adapted to be secured to a framework of a header and provided with forwardly projecting prongs together with a sickle bar substantially enclosed by the structure and having blades projecting in advance of the prongs.

Any type of harvesting machinery which uses a sickle guard can usually be provided with the sickle guard of our invention, and for convenience in illustration, we have disclosed our novel sickle guard attached to the framework 6 of a header which is equipped with a draper having an upper run 7 and a lower run 8. The framework preferably includes an angle 9 for supporting the upper run of the draper and a closure 11 for the bottom of the header suitably secured in place. A guard angle 12 is disposed along the framework 6 and preferably overlies a portion of the upper run 7 of the draper. The framework 6 and the angle 9 are provided with thru perforations 13 in which bolts and nuts 14 are seated. The bolts and nuts normally maintain the relationship between the angle 9 and the framework 6 and in addition secure the sickle guard in place. In machines at present in use, a sickle guard of the type shown in dotted lines in Fig. 1 is secured to the framework 6 by means of a pair of nuts and bolts such as 14, and preferably we form our sickle guard to replace the sickle guards of that type, but it is to be understood that we can secure our sickle guard to the frame work 6 in any manner desired.

Our sickle guard is preferably constructed of a lower plate 16 of metal of such a length that it will replace two of the old type sickle guards. The lower plate is preferably of skeleton construction, as shown in the right half of Fig. 1, and includes a depending flange 17 which abuts the framework 6 and is perforated to be secured by the nuts and bolts 14. Extending forwardly from the flange 17 and preferably at a slight incline are arms 18 which are united at their forward ends to provide a channel 19. The channel is preferably continuous thruout the length of the sickle guard unit and is adapted to be alined with the corresponding channels of similar units placed at either side. Projecting forwardly from the channel 19 are a series of prongs 21 which are usually equally spaced along the sickle guard unit. The upper surface of the prongs is preferably flat while their under surfaces are generally semi-circular or of rounded contour. The angle at which the plate 16 lies and the length and contour of the prongs 21 is preferably such that when the header is tilted, the prongs can be substantially contacted with the ground. The entire plate as described can be made integrally, and that is the preferred construction, but we can, of course, make the plate of separate pieces without altering its function.

Overlying plate 16 and forming a closure for channel 19 is a cover plate 22. The cover plate is preferably an integral casting of similar external dimensions to plate 16 and is provided with a flat undersurface which makes a close fit with the skeleton construction of plate 16. The cover plate and the lower plate are secured together by any suitable fastening such as the bolts and nuts 23. The cover plate is preferably of smooth, flat contour and is designed to form substantially a continuation of the upper surface of the framework 6 and of angle 12. At its leading end, the cover plate 22 is provided with a plurality of prongs 24 which are of the same general contour and spacing as the prongs 21 on the lower plate. They are preferably arranged to lie in substantially vertical registry with the prongs 21 but due to the relief of the lower plate 16, are slightly spaced therefrom.

Lying in channel 19 and preferably extending thruout the length of the sickle, which includes a plurality of the sickle guard units described, is a sickle bar 26 usually comprising a continuous strap of metal. To the sickle bar are affixed a number of generally triangular blades 27 secured thereto in the usual fashion. The sickle bar 26 is an easy running fit in the channel while the blades move freely in the space between the upper prongs 24 and the lower prongs 21. The length of the blades 27 is preferably such that they project slightly beyond the ends of the prongs. In order to provide a means of introducing lubricant to the substantially closed channel 19, the cover plate 22 is preferably provided with apertures 28 disposed above the sickle bar 26 and communicating with the channel 19. Below the channel and provided in the plate 16 is a complementary aperture 29 which permits lubricant to drain from the channel.

With the sickle guard of our invention secured to the framework 6 of a header, the header can be tilted at will to position the prongs 21 and 24 as close to the ground as it is desired to cut the standing grain. The rapid motion of the projecting knives 27 precludes the possibility of any débris or foreign material adhering to the prongs and clogging the sickle. Grain which is cut by a sickle employing the guard of our invention passes with great facility over the smooth cover plate 22 and rides easily from the cover plate over the angle 12 onto the upper run 7 of the draper. It is to be noted that there are no projections or irregularities for catching grain. The construction and flatness of the upper plate lend themselves readily to the employment of sweepers or brushes on the blades of a reel, not shown, whose path is indicated by the dotted line 31 in Fig. 2.

Lubricant can readily be introduced thru the apertures 28 and lubricant the vibrating sickle bar 26. If the lubricant becomes contaminated with dirt and foreign matter, the entire channel 19 can easily be flushed with kerosene which escapes readily thru the lower aperture 29. Fresh lubricant can then be introduced thru aperture 28 and the sickle bar can always be provided with adequate lubrication.

We claim:

1. A sickle guard comprising a structure extending for substantially the length of a sickle bar and having a channel therein, a sickle bar adapted to run in said channel, and a cover for said channel, said cover having an aperture thru which lubricant can flow into said channel.

2. A sickle guard comprising a plurality of plates adapted substantially to abut each other on their lateral edges, a plurality of cover plates adapted substantially to abut each other on their lateral edges to provide a substantially continuous exposed surface, means for fastening said plates in operative relationship, and a sickle bar adapted to run between said first named plates and said cover plates.

3. A sickle guard comprising a plurality of plates, each of said plates having a transverse depression therein, means for securing said plates in mutually abutting relationship with said depressions in alinement to provide a channel, a plurality of abutting cover plates of substantially uniform thickness overlying said channel, and a sickle bar running in said channel.

4. A sickle guard comprising a framework, a plurality of abutting plates fastened to said framework, a sickle bar supported by said plurality of plates, a plurality of abutting cover plates overlying said sickle bar and providing a substantially smooth, continuous surface, and means for holding said cover plates in operative relationship.

5. A sickle guard comprising a plurality of plates adapted to be secured to a framework, a plurality of cover plates secured to said first-named plates and having exposed faces in immediate juxtaposition to form a substantially continuous, smooth surface continuing the surface of said framework, and a sickle bar adapted to run between said respective pluralities of plates.

6. A sickle guard comprising an extensive sickle bar, a plurality of joined plates forming a support for said sickle bar, and a plurality of cover plates joined together to shroud said sickle bar and provide a substantially continuous exposed surface.

7. A sickle guard comprising a plurality of structures adapted to be secured to the framework of a header, each of said structures from its leading edge to its point of attachment to said framework having a substantially flat exposed surface continuing the surface of said framework and continuing the surfaces of the sequent structures, and a sickle bar adapted to run in said plurality of structures.

In testimony whereof, we have hereunto set our hands.

ELMER PATTERSON.
LESTER McDOW.